United States Patent
Homma

(10) Patent No.: US 8,148,046 B2
(45) Date of Patent: Apr. 3, 2012

(54) OPTICAL DISK STORAGE MEDIUM

(75) Inventor: Tamotsu Homma, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1114 days.

(21) Appl. No.: 11/910,353

(22) PCT Filed: Mar. 30, 2006

(86) PCT No.: PCT/JP2006/306734
§ 371 (c)(1),
(2), (4) Date: Oct. 1, 2007

(87) PCT Pub. No.: WO2006/106869
PCT Pub. Date: Oct. 12, 2006

(65) Prior Publication Data
US 2009/0087777 A1  Apr. 2, 2009

(30) Foreign Application Priority Data

Mar. 30, 2005  (JP) ................... 2005-096968

(51) Int. Cl.
*G11B 7/24* (2006.01)

(52) U.S. Cl. ................................. 430/270.11

(58) Field of Classification Search .......... None
See application file for complete search history.

(56) References Cited

U.S. PATENT DOCUMENTS

| | | | |
|---|---|---|---|
| 2002/0081400 A1* | 6/2002 | Gocho et al. | 428/29 |
| 2002/0191517 A1 | 12/2002 | Honda et al. | |
| 2004/0027981 A1* | 2/2004 | Schoeppel | 369/275.4 |
| 2005/0176582 A1* | 8/2005 | Arai et al. | 503/201 |
| 2006/0013116 A1 | 1/2006 | Matsuishi et al. | |

FOREIGN PATENT DOCUMENTS

| | | |
|---|---|---|
| JP | 5-198015 A | 8/1993 |
| JP | 8-279189 A | 10/1996 |
| JP | 8-329530 A | 12/1996 |
| JP | 9-106580 A | 4/1997 |
| JP | 9-245371 A | 9/1997 |
| JP | 2000-173096 A | 6/2000 |
| JP | 2002-203321 A | 7/2002 |
| JP | 2004-234820 A | 8/2004 |
| JP | 2004-246981 A | 9/2004 |
| WO | WO 04/064052 | * 12/2003 |

OTHER PUBLICATIONS

International Search Report dated Jul. 4, 2006 (Two (2) pages).
Japanese Office Action dated Oct. 6, 2009 (six (6) pages).

* cited by examiner

*Primary Examiner* — Cynthia Kelly
*Assistant Examiner* — Anna Verderame
(74) *Attorney, Agent, or Firm* — Crowell & Moring LLP

(57) ABSTRACT

The surface of a transparent layer provided on the uppermost layer of the label side of an optical disk is subjected to pearskin finish. As a result, a light from a reflection layer is prevented from directly entering a user who has viewed an image on the label side, and an antiglare phenomenon is prevented from occurring. This configuration enables good viewing.

6 Claims, 2 Drawing Sheets

- Label Writing Laser Beam
- 7 Antiglare Effect Reducing Finish
- 6 Pearskin Finish
- 5 Transparent Cover Layer
- 4 Transparent Protective Layer
- 3 Label Image Formation Layer
- 2 Reflection Layer
- 1 Substrate

- 9 Flap
- 5 Transparent Cover Layer

OPTICAL DISK STORAGE MEDIUM

TECHNICAL FIELD

The present invention relates to an optical disk storage medium (which is hereinafter referred to as an "optical disk") having a label side on which an image can be formed by utilizing a laser beam output from a pickup for writing data.

BACKGROUND ART

An example of an optical disk on which an image can be formed is disclosed in JP-A-2002-203321. The optical disk is configured such that a dye layer (recording layer), a reflection layer, a visible light characteristic changing layer, and a protective layer are successively formed on one side of a transparent substrate. It is possible to visually identify the visible light characteristic changing layer through the transparent protective layer. The visible light characteristic changing layer is a layer made of a material changing in visible light characteristics of the irradiated site when irradiated with a laser light of a prescribed power through the protective layer.

Recording of data is carried out by applying a writing laser from an optical pickup from the substrate side, and thermally changing the characteristic of the dye layer (recording layer).

In order to draw characters, patterns, and the like on the label side of an optical disk, the following procedure is carried out. When the optical disk is set on a turn table of a write unit, it is set with the label side of the optical disk facing the side to be irradiated with a laser beam. Namely, it is set on the turn table upside down from the state of general data recording. Thus, a laser beam from the optical pickup is applied to the visible light characteristic changing layer through the protective layer of the optical disk. The laser beam is concentrated through an objective lens of the optical pickup, so that the energy density is increased, resulting in an increase in temperature of the visible light characteristic changing layer. As a result, the visible light characteristic of the part irradiated with the laser beam, such as the transmittance of the visible light changes. The image on the label side is expressed by the contrast between before change and after change of the visible light characteristics of the visible light characteristic changing layer.

As the document for drawing characters and the like on the label side of an optical disk by a laser beam, there is the following one:
Patent Document 1: JP-A-2002-203321

DISCLOSURE OF THE INVENTION

Problems that the Invention is to Solve

A visible light characteristic changing layer provided on the label side of an optical disk is irradiated with a laser beam, so that the visible light characteristics of the substance forming the visible light characteristic changing layer are changed. Thus, characters, patterns, and the like are drawn thereon. In such an optical disk, in order to form a clear label image, it is effective to increase the difference in contrast between before applying a laser beam and after applying a laser beam and changing the visible light characteristics. For this reason, as the material for the visible light characteristic changing layer, there is selected the one which is black before irradiation with a laser beam, and becomes transparent after the irradiation.

When in order to make clear the characters and the like drawn on the label side, when a substance which becomes more clear through irradiation with a laser is selected as a material for the visible light characteristic changing layer, a user visually views directly the reflection layer under the visible light characteristic changing layer at the portion which has become transparent through irradiation with a laser beam. Thus, when a user of an optical disk reads characters and the like drawn on the label, the user directly views the reflection layer at the drawn portion. Accordingly, the user feels glare. Thus, the portion of black characters becomes difficult to view due to an intense reflected light. Namely, a blinding effect occurs, which entails another problem that characters and the like become difficult to recognize.

In order to solve the problem, it is conceivable to reduce the reflectance of the reflection film. However, the reduction of the reflectance causes the problem in which control of the focus position performed on the pickup for drawing of a label image becomes difficult.

Means for Solving the Problems

The present invention is for solving the foregoing problems. The invention provides an optical disk which prevents the blinding effect without reducing the reflectance of the reflection layer, and makes it easy for a user to visually identify characters, patterns, and the like drawn on the label side.

In accordance with a first configuration of the invention, an optical disk having a label side including a reflection layer, a label image formation layer, and a transparent protective layer, successively stacked therein, is characterized in that the transparent protective layer has, on one side, a pearskin finished surface subjected to pearskin finish exhibiting an antiglare effect against a reflected light from the reflection side. With this configuration, an antiglare effect is exhibited, which enables the formed label image to be viewed not glaringly but clearly.

In accordance with a second configuration of the invention, an optical disk having a label side including a reflection layer, a label image formation layer, and a transparent protective layer, successively stacked therein, is characterized in that on the surface of the transparent protective layer, a pearskin finished surface subjected to pearskin finish exhibiting an antiglare effect against a reflected light from the reflection side is provided, and that a transparent cover layer for reducing the antiglare effect of the pearskin finished surface is further provided on the transparent protective layer. With this configuration, it is possible to implement an optical disk which provides an antiglare effect, and in which the pearskin finished surface less adversely affects the control of the focus position for label image writing.

In accordance with a third configuration of the invention, an optical disk having a label side including a reflection layer, a label image formation layer, and a transparent protective layer, successively stacked therein, is characterized in that on the surface of the transparent protective layer, a pearskin finished surface subjected to pearskin finish exhibiting an antiglare effect against a reflected light from the reflection side is provided, that a transparent cover layer for reducing the antiglare effect of the pearskin finished surface is further provided on the transparent protective layer, and that the transparent film layer is configured such as to be peelable from the transparent protective layer. With this configuration, by peeling off the transparent film layer after the formation of a label image, it becomes possible to implement the first configuration of the invention. As a result, it is possible to obtain a large antiglare effect.

In accordance with a fourth configuration of the invention, an optical disk having a label side including a reflection layer, a label image formation layer, and a transparent protective layer, successively stacked therein, is characterized in that the label image formation layer is a layer on which a label image can be formed by a laser beam applied through the transparent protective layer, and that the transparent protective layer has, on one side, a pearskin finished surface subjected to pearskin finish exhibiting an antiglare effect against a reflected light from the reflection side. With this configuration, an antiglare effect is exhibited, which enables the formed label image to be viewed not glaringly but clearly.

BEST MODE FOR CARRYING OUT THE INVENTION

Figure 1:
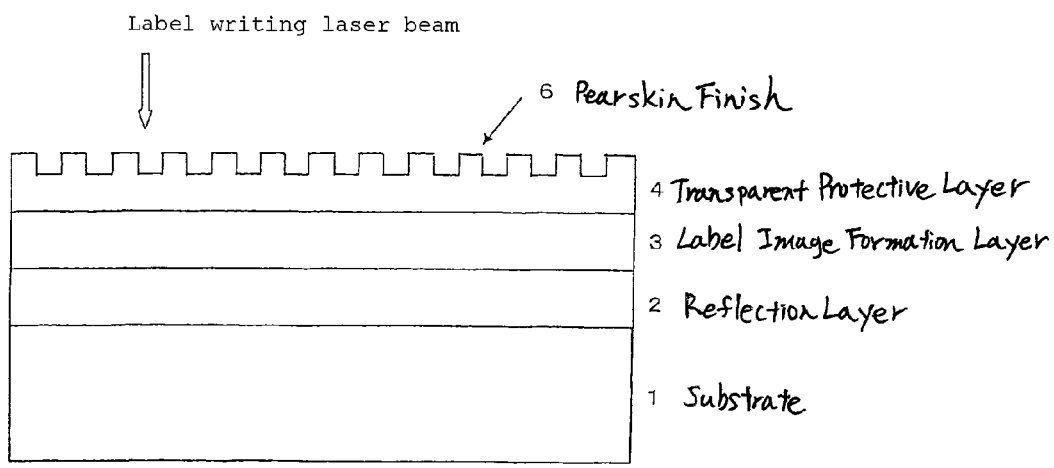
FIG. 1 is a diagram showing a first embodiment of an optical disk in accordance with the present invention.

FIG. 1 shows a cross sectional view of an optical disk according to a first embodiment of the present invention. A reference numeral 1 represents a substrate corresponding to an optical disk such as CD, DVD, or HD-DVD. Alternatively, it may be the one corresponding to the substrate and the dye layer (recording layer) of a conventional optical disk. A reference numeral 2 is a reflector, which may be also used as a reflection layer of a conventional optical disk. A reference numeral 3 represents a label image formation layer, and 4 represents a transparent protective layer.

First Embodiment

In this embodiment, a pearskin finished surface subjected to pearskin finish (rough finish, matte finish, etc.) for forming microscopic unevenness is provided on one side of a transparent protective layer 4 provided on the uppermost portion on the label side of an optical disk. Drawing of characters, patterns, and the like on the label side is carried out by irradiating a label image formation layer 3 with a laser beam via the pearskin finished surface of the transparent protective layer 4. The irradiation with a laser beam changes the visible light characteristics of the label image formation layer 3. Accordingly, an intense white light reflected by the underlying reflection layer 2 comes to be viewed by a user. When the reflected light directly enters the eyes of the user, a blinding effect occurs on the user. However, in this embodiment, the surface of the transparent protective layer 4 has been subjected to pearskin finish. Thus, the white light is attenuated by the pearskin finished surface, so that a blinding effect does not occur on a user, or the occurrence of the blinding effect is reduced.

It is possible to subject both the sides of the transparent protective layer to pearskin finish. However, when one side of the transparent protective layer is subjected to pearskin finishing, there can arise a problem that control of the focus position for image formation is affected. Therefore, it is preferable to adopt a configuration such that the outside surface of the transparent protective layer, i.e., the surface of the label side, is subjected to pearskin finish. By subjecting the surface of the label side to pearskin finish, it is possible to further add improvement of removing the effect exerted on the focus position control.

Second Embodiment

Figure 2:
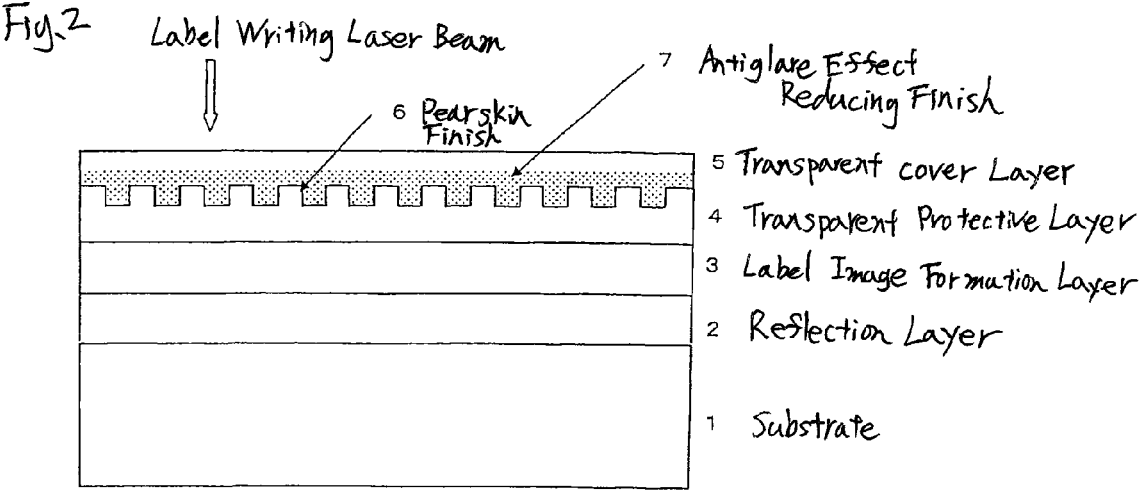
FIG. 2 is a diagram showing a second embodiment of the optical disk in accordance with the invention.

FIG. 2 shows a cross sectional view of an optical disk in accordance with a second embodiment of the invention. In this embodiment, a transparent cover layer 5 subjected to antiglare effect reducing finish is provided in such a manner as to cover the pearskin finished surface of the surface of the transparent protective layer 4 subjected to pearskin finish. The antiglare effect reducing finish 7 given on the transparent cover layer 5 fits the pearskin finish 6 provided on the transparent protective layer 5. Thus, the transparent cover layer 5 and the transparent protective layer 4 are integrated into one piece to function as one layer of transparent protective layer. This eliminates scattering of a laser beam due to the pearskin finished surface of the transparent protective layer 4, which enables precise control of the focus position of the laser beam.

The antiglare effect reducing finish 7 of the transparent cover layer 5 can be configured so as to physically fit the pearskin finish 6 of the transparent protective layer 4 and to be integrated therewith into one piece Alternatively, the antiglare effect reducing finish can be configured of an adhesive material having an appropriate viscosity capable of fusing with the pearskin finish 6 into one piece.

Third Embodiment

Figure 3A:
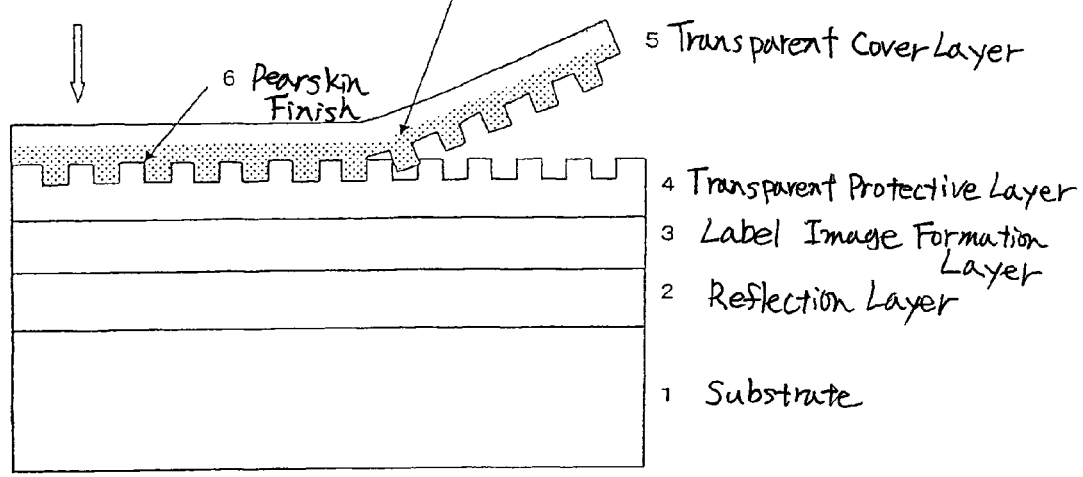
FIGS. 3A and 3B are Diagrams showing a third embodiment of the optical disk in accordance with the invention.
Figure 3B:
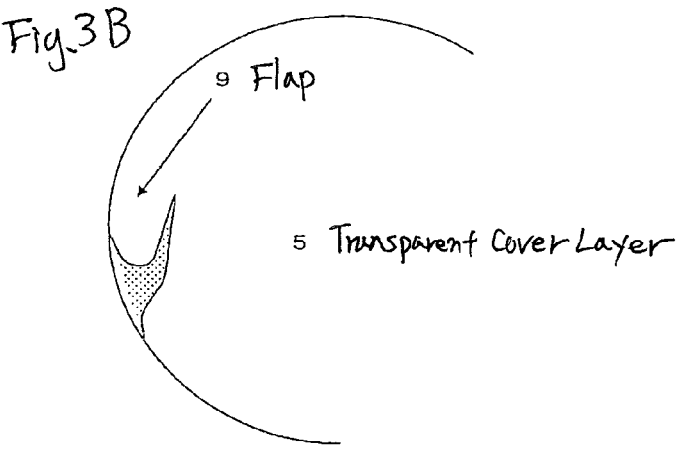

FIG. 3B shows a cross sectional view of an optical disk in accordance with a third embodiment. It shows the following manner: the optical disk shown in FIG. 2 is irradiated with a laser beam, and desired characters, patterns, and the like are drawn on the label side; and then the transparent cover layer 5 is peeled off from the transparent protective layer 4.

After completion of writing of desired characters, image and the like on the label side, the transparent cover layer 5 is removed from the transparent protective layer 4. Removal of the transparent cover layer 5 causes the pearskin finish formed on the surface of the transparent protective layer 4 to be exposed. Thus, an intense reflected light from the reflection layer 2 is scattered and attenuated by the pearskin finished surface. As a result, a blinding effect does not occur on the user who views the label side. In this embodiment, drawing on the label side is carried out with the transparent protective layer 4 covered with the transparent cover layer 5. Therefore, precise focus position control is possible. Then, the transparent cover layer 5 is removed from the optical disk, thereby characters, patterns, and the like are viewed through the pearskin finished surface provided on the surface of the transparent protective layer 4. As a result, it becomes possible to obtain soft sense of sight.

In order to aid the removing operation for removing the transparent cover layer 5 from the transparent protective layer 4, it is possible to provide a flap or the like as an auxiliary means at the inner peripheral portion or the outer peripheral portion of the transparent cover layer 5. FIG. 3B shows an example in which a flap 9 is provided in the outer peripheral portion of the transparent cover layer 5. A user can peel off the transparent cover layer with ease by the use of the flap.

Whereas, the size of embossment (unevenness) of the pearskin finish is determined in view of the resolution of the image, or the pixel size. Assuming that the resolution on data is about 100 μm, and the resolution achievable by the apparatus is about 10 μm, about 10- to 100-μm embossment is desirably formed as pearskin finish.

The invention claimed is:

1. An optical disk with a label side comprising:
a substrate;
a reflection layer formed on the substrate;
an image formation layer formed on the reflection layer;
a transparent protective layer formed on the image formation layer, one side of the transparent protective layer having a pearskin finish with a structure that provides an antiglare effect against a reflection light from the reflection side,
wherein the one side of the transparent protective layer is a label side surface of the optical disk, and
wherein the optical disk further comprises a transparent cover layer formed on the transparent protective layer for reducing the antiglare effect of the pearskin finish.

2. The optical disk according to claim 1, wherein the transparent cover layer is capable of being peeled from the transparent protective layer.

3. The optical disk according to claim 1, wherein the size of embossment of the pearskin finish is 10 to 100 μm.

4. An optical disk comprising:
a substrate;
a reflection layer formed on the substrate;
an image formation layer formed on the reflection layer; and
a transparent protective layer formed on the image formation layer,
wherein an image is formed on the image formation layer by making a part of the image information layer transparent with a laser beam applied through the transparent protective layer,
wherein one side of the transparent protective layer has a pearskin finish with a structure that provides an antiglare effect against a reflected light from the reflection side,
wherein the one side of the transparent protective layer is a label side surface of the optical disk, and
wherein the optical disk further comprises a transparent cover layer formed on the transparent protective layer for reducing the antiglare effect of the pearskin finish.

5. The optical disk according to claim 4, wherein the transparent cover layer is capable of being peeled from the transparent protective layer.

6. An optical disk comprising:
a substrate;
a reflection layer formed on the substrate;
an image formation layer formed on the reflection layer; and
a transparent protective layer formed on the image formation layer,
wherein an image is formed on the image formation layer by making a part of the image information layer transparent with a laser beam applied through the transparent protective layer,
wherein one side of the transparent protective layer has a pearskin finish with a structure that provides an antiglare effect against a reflected light from the reflection side,
wherein the size of embossment of the pearskin finish is 10 to 100 μm.

* * * * *